US011842311B2

(12) United States Patent
Dumoulin et al.

(10) Patent No.: US 11,842,311 B2
(45) Date of Patent: *Dec. 12, 2023

(54) MULTIVARIATE RISK ASSESSMENT VIA POISSON SHELVES

(71) Applicant: Verint Americas Inc., Alpharetta, GA (US)

(72) Inventors: Joseph Wayne Dumoulin, Spokane Valley, WA (US); Cynthia Freeman, Spokane Valley, WA (US); James DelloStritto, Reston, VA (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,400

(22) Filed: May 16, 2022

(65) Prior Publication Data

US 2022/0405660 A1 Dec. 22, 2022

Related U.S. Application Data

(62) Division of application No. 16/589,511, filed on Oct. 1, 2019, now Pat. No. 11,334,832.

(Continued)

(51) Int. Cl.
*G06Q 10/00* (2023.01)
*G06Q 10/0635* (2023.01)
(Continued)

(52) U.S. Cl.
CPC ......... *G06Q 10/0635* (2013.01); *G06F 17/18* (2013.01); *G06Q 30/0185* (2013.01); *H04M 15/00* (2013.01); *H04M 15/47* (2013.01)

(58) Field of Classification Search
CPC ............ G06Q 10/0635; G06Q 30/0185; G06F 17/18; H04M 15/00; H04M 15/47
See application file for complete search history.

(56) References Cited

U.S. PATENT DOCUMENTS

| 6,772,120 B1 | 8/2004 | Moreno et al. | |
| 7,870,078 B2 * | 1/2011 | Clark | H04M 15/00 705/325 |

(Continued)

FOREIGN PATENT DOCUMENTS

| EP | 3623964 | 3/2020 |
| KR | 1020180081444 | 7/2018 |

(Continued)

OTHER PUBLICATIONS

Adams, R., et al., "Bayesian Online Changepoint Detection," arXiv preprint arXiv:0710.3742, 2007, 7 pages.

(Continued)

*Primary Examiner* — Khai M Nguyen
(74) *Attorney, Agent, or Firm* — Meunier Carlin & Curfman LLC (57) ABSTRACT

Detecting fraudulent activity can be a complex, manual process. In this paper, we adapt statistical properties of count data in a novel algorithm to uncover records exhibiting high risk for fraud. Our method identifies shelves, partitioning data under the counts using a Student's t-distribution. We apply this methodology on a univariate dataset including cumulative results from phone calls to a customer service center. Additionally, we extend this technique to multivariate data, illustrating that the same method is applicable to both univariate and multivariate data.

19 Claims, 9 Drawing Sheets

Related U.S. Application Data (60) Provisional application No. 62/740,821, filed on Oct. 3, 2018.

(51) Int. Cl.
   *G06F 17/18* (2006.01)
   *G06Q 30/018* (2023.01)
   *H04M 15/00* (2006.01)

(56) References Cited

U.S. PATENT DOCUMENTS

| | | |
|---|---|---|
| 9,256,663 B2 | 2/2016 | Bhatia et al. |
| 9,407,651 B2 | 8/2016 | Mathis |
| 9,411,800 B2 | 8/2016 | Morin et al. |
| 9,729,727 B1 | 8/2017 | Zhang |
| 10,607,604 B2 | 3/2020 | Itoh et al. |
| 10,805,327 B1 | 10/2020 | Grilli |
| 10,896,472 B1 | 1/2021 | Stack et al. |
| 11,222,627 B1 | 1/2022 | Qian et al. |
| 2007/0299798 A1 | 12/2007 | Suyama et al. |
| 2008/0052259 A1 | 2/2008 | Shiffman et al. |
| 2009/0192781 A1 | 7/2009 | Bangalore et al. |
| 2012/0109651 A1 | 5/2012 | Chen |
| 2012/0127540 A1 | 5/2012 | Moore et al. |
| 2012/0136703 A1 | 5/2012 | Stewart |
| 2012/0136704 A1 | 5/2012 | Carlson et al. |
| 2012/0143860 A1 | 6/2012 | Gherman et al. |
| 2012/0254333 A1 | 10/2012 | Chandramouli et al. |
| 2013/0018650 A1 | 1/2013 | Moore et al. |
| 2013/0046531 A1 | 2/2013 | Chandramouli et al. |
| 2013/0138428 A1 | 5/2013 | Chandramouli et al. |
| 2013/0246386 A1 | 9/2013 | Gherman et al. |
| 2014/0222476 A1 | 8/2014 | Romano |
| 2014/0280621 A1 | 9/2014 | Bourdaillet et al. |
| 2015/0047026 A1 | 2/2015 | Neil et al. |
| 2015/0081494 A1* | 3/2015 | Erdelmeier ............ G06F 21/552 705/35 |
| 2016/0117466 A1 | 4/2016 | Singh |
| 2016/0170996 A1 | 6/2016 | Frank et al. |
| 2016/0267490 A1* | 9/2016 | Johnson ................ G07C 13/00 |
| 2017/0068709 A1 | 3/2017 | Dasgupta et al. |
| 2017/0294192 A1 | 10/2017 | Bradley et al. |
| 2017/0357828 A1 | 12/2017 | Phillips |
| 2018/0018686 A1 | 1/2018 | Wood et al. |
| 2018/0032862 A1 | 2/2018 | Oliner et al. |
| 2018/0048661 A1 | 2/2018 | Bird et al. |
| 2018/0091539 A1 | 3/2018 | Marquardt et al. |
| 2018/0113782 A1 | 4/2018 | Valacich et al. |
| 2018/0174600 A1 | 6/2018 | Chaudhuri et al. |
| 2018/0204217 A1* | 7/2018 | Bedi ................. G06Q 20/4016 |
| 2018/0217749 A1 | 8/2018 | Alsharif et al. |
| 2018/0316704 A1 | 11/2018 | Joseph Durairaj et al. |
| 2018/0373991 A1 | 12/2018 | Rosenberg et al. |
| 2019/0138643 A1 | 5/2019 | Saini et al. |
| 2019/0188741 A1 | 6/2019 | Wood et al. |
| 2019/0205771 A1 | 7/2019 | Lin et al. |
| 2019/0236139 A1 | 8/2019 | DeFelice et al. |
| 2019/0236148 A1 | 8/2019 | DeFelice |
| 2019/0304470 A1 | 10/2019 | Ghaemmaghami et al. |
| 2019/0354524 A1 | 11/2019 | Xu et al. |
| 2019/0392252 A1 | 12/2019 | Fighel et al. |
| 2020/0160229 A1 | 5/2020 | Atcheson |
| 2020/0286469 A1 | 9/2020 | Freeman |
| 2020/0401768 A1 | 12/2020 | Freeman |
| 2021/0081501 A1 | 3/2021 | RoyChowdhury et al. |
| 2021/0103580 A1* | 4/2021 | Schierz ............... G06F 16/2365 |
| 2022/0180061 A1 | 6/2022 | Kim et al. |
| 2022/0189599 A1 | 6/2022 | Petch et al. |
| 2023/0004891 A1* | 1/2023 | Dumoulin ............. H04W 12/12 |

FOREIGN PATENT DOCUMENTS

| | | |
|---|---|---|
| WO | 2007/005975 | 1/2007 |
| WO | 2018/128403 | 7/2018 |
| WO | 2019/060327 | 3/2019 |

OTHER PUBLICATIONS

Ahmad, S., et al., "Unsupervised real-time anomaly detection for streaming data," Neurocomputing, vol. 262, 2017, pp. 134-147.

Aktolga, E., et al., "Detecting Outlier Sections in US Congressional Legislation," Proceedings of the 34th International ACM SIGIR Conference on Research and Development in Information Retrieval, 2011, pp. 235-244.

Allen, L., et al., "On Twitter Purge: A Retrospective Analysis of Suspended Users," Association for the Advancement of Artificial Intelligence, 2020, 8 pages.

Banerjee, A., et al., "Anomaly Detection: A Tutorial," SIAM Conference on Data Mining, 2008, 103 pages.

Brownlee, J., "How to Check if Time Series Data is Stationary with Python," retrieved on Dec. 13, 2019 at https://machinelearningmastery.com/time-series-data-stationary-python, 2016, 51 pages.

Buck, C., et al., "N-gram Counts and Language Models from the Common Crawl," Proceedings of the Ninth International Conference on Language Resources and Evaluation (LREC), 2014, pp. 3579-3584.

Chandola, V., et al., "Anomaly Detection: A Survey," ACM Computing Surveys, vol. 41, No. 3, Article 15, 2009, 58 pages.

Chen, Y-C, et al., "Event Detection using Customer Care Calls," Proceedings of the IEEE International Conference on Computer Communications (INFOCOM), 2013, pp. 1690-1698.

Cheung, Y.-W., et al., "Lag Order and Critical Values of the Augmented Dickey-Fuller Test," Journal of Business & Economic Statistics, vol. 13, No. 3, 1995, pp. 277-280.

Choudhary, S., et al., "Sparse Decomposition for Time Series Forecasting and Anomaly Detection," Proceedings of the SIAM International Conference on Data Mining, 2018, pp. 522-530.

Cleveland, R.B., et al., "STL: A Seasonal-Trend Decomposition Procedure Based on Loess," Journal of Official Statistics, vol. 6, No. 1, 1990, pp. 3-73.

Danescu-Niculescu-Mizil, C., et al., "No Country for Old Members: User Lifecycle and Linguistic Change in Online Communities," Proceedings of the 22nd International Conference on World Wide Web, 2013, pp. 307-318.

"datastream.io," Mentat Innovations, retrieved on Jan. 6, 2020 from https://blog.ment.at/datastream-io-4863db7286b7, 2017, 2 pages.

Forsyth, E., et al., "The NPS Chat Corpus," retrieved on Apr. 21, 2020 at http://faculty.nps.edu/cmartell/NPSChat.htm, 2019, 2 pages.

Freeman, C., et al., ; "Experimental Comparison of Online Anomaly Detection Algorithms," The 32nd International Florida Artificial Intelligence Research Society Conference (Flairs-32), 2019, pp. 364-369.

Freeman, C., et al., "Human-in-the-Loop Selection of Optimal Time Series Anomaly Detection Methods," $7^{th}$ AAAI Conference on Human Computation and Crowdsourcing (HCOMP), 2019, 3 pages.

Fulton, C., "Estimating time series models by state space methods in Python: Statsmodels," http://www.chadfulton.com/fulton_statsmodels, 2017, 78 pages.

Grave, E., et al., "Unbounded cache model for online language modeling with open vocabulary," Advances in Neural Information Processing Systems, 2017, pp. 6042-6052.

Guthrie, D., et al., "An Unsupervised Approach for the Detection of Outliers in Corpora," Statistics, 2008, pp. 3409-3413.

Guthrie, D., "Unsupervised Detection of Anomalous Text," Thesis, 2008, 186 pages.

Hawkins, J., et al., "Hierarchical Temporal Memory including HTM Cortical Learning Algorithms," Numenta, 2011, 68 pages.

Herath, J.D., et al., "RAMP: Real-Time Anomaly Detection in Scientific Workflows," IEEE International Conference on Big Data (Big Data), 2019, pp. 1367-1374.

Hochenbaum, J., et al., "Automatic Anomaly Detection in the Cloud Via Statistical Learning," arXiv preprint arXiv:1704.07706, 2017, 13 pages.

Hodge, V., et al., "A Survey of Outlier Detection Methodologies," Artificial Intelligence Review, vol. 22, No. 2, 2004, pp. 85-126.

Hyndman, R.J., et al., "Automatic Time Series Forecasting: The forecast Package for R," Journal of Statistical Software, vol. 27, Issue 3, 2008, 22 pages.

(56) References Cited

OTHER PUBLICATIONS

Inouye, D., et al., "A Review of Multivariate Distributions for Count Data Derived from the Poisson Distribution," Computational Statistics, vol. 9, No. 3, 2017, 40 pages.
Isbister, T., "Anomaly detection on social media using ARIMA models," Thesis, Uppsala Universitet, 2015, 38 pages.
Jain, S., et al., "Characterizing and Detecting Livestreaming Chatbots," IEEE/ACM International Conference on Advances in Social Networks Analysis and Mining, 2019, pp. 683-690.
Jiang, N., "Perplexity Vs Cross-entropy," retrieved on Oct. 2, 2020 from https://jiangnanhugo.github.io/2016/perplexity-vs-cross-entropy, 2016, 3 pages.
Jozefowicz, R., et al., "Exploring the Limits of Language Modeling," arXiv preprint arXiv:1602.02410, 2016, 11 pages.
Kannan, R., et al., "Outlier Detection for Text Data," 15th Proceedings of the 2017 SIAM International Conference on Data Mining, 2017, pp. 489-497.
Kelly, S., et al., "Propagating Disaster Warnings on Social and Digital Media," International Conference on Pervasive Computing, 2015, pp. 475-484.
Kenter, T., et al., "Short Text Similarity with Word Embeddings," Proceedings of the $24^{th}$ ACM International Conference on Information and Knowledge Management, 2015, pp. 1411-1420.
Keogh, E., et al., "Hot Sax: Efficiently Finding the Most Unusual Time Series Subsequence," The $5^{th}$ IEEE International Conference on Data Mining (ICDM), 2005, pp. 440-449.
Keshvani, A., "How to use the Autocorreation Function (ACF)?," https://coolstatsblog.com/2013/08/07/how-to-use-the-autocorreation-function-acf, 2013, 2 pages.
Kowalska, K., et al., "Maritime Anomaly Detection using Gaussian Process Active Learning," IEEE $15^{th}$ International Conference on Information Fusion, 2012, pp. 1164-1171.
Kulick, J., "Bayesian change-point detection," https://github.com/hildensia/bayesian_changepoint_detection, 2016, 1 page.
Laptev, N., et al., "Generic and Scalable Framework for Automated Time-series Anomaly Detection," Proceedings of the 21th ACM SIGKDD International Conference on Knowledge Discovery and Data Mining, 2015, pp. 1939-1947.
Lata, L., et al., "A Comprehensive Survey of Fraud Detection Techniques," International Journal of Applied Information Systems, vol. 10, No. 2, 2015, pp. 26-32.
Lavin, A., et al., "Evaluating Real-time Anomaly Detection Algorithms - the Numenta Anomaly Benchmark," IEEE 14th International Conference on Machine Learning and Applications (ICMLA), 2015, pp. 38-44.
Lili, C., "Research of E-commerce Supply Chain Management with CreditRisk + model," International Conference on Management of e-Commerce and e-Government, 2012, 3 pages.
Linden, M., "Testing Growth Convergence with Time Series Data—a non-parametric approach," International Review of Applied Economics, vol. 14, Issue 3, 2000, pp. 361-370.
Liu, D., et al., "Opprentice: Towards Practical and Automatic Anomaly Detection Through Machine Learning," Proceedings of the 2015 Internet Measurement Conference (ACM), 2015, pp. 211-224.
Lowe, R., et al., "The Ubuntu Dialogue Corpus: A Large Data Set for Research in Unstructured Multi-Turn Dialogue Systems," Proceedings of the SIGDIAL 2015 Conference, 2015, pp. 285-294.
"Luminol," LinkedIn, retrieved on Nov. 5, 2020 from https://github.com/linkedin/luminol, 2018, 9 pages.
Madrid, F., et al., "Efficient and Effective Labeling of Massive Entomological Datasets," IEEE International Conference on Data Science and Advanced Analytics (DSAA), 2019, 9 pages.
Mäkinen, M. S., "Deep Learning for Anomaly Detection in Linux System Log," Thesis, Aalto University School of Science, 2019, 61 pages.
"Media Bias Fact Check," NowThis News, retrieved on Apr. 21, 2020 at https://mediabiasfactcheck.com/nowthis-news/, 2019, 5 pages.

Morgan, A., et al., "Anomalyzer: Probabilistic anomaly detection for time series data," Lytics, retrieved on Nov. 4, 2020 from https://github.com/lylics/anomalyzer, 2015, 4 pages.
Mueen, A., et al., "The Fastest Similarity Search Algorithm for Time Series Subsequences under Euclidean Distance and Correlation Coefficient," retrieved on May 27, 2020 at http://www.cs.unm.edu/~mueen/FastestSimilaritySearch.html, 2017, 3 pages.
Norvig, P., "How to Write a Spelling Corrector," retrieved on May 27, 2020 at https://norvig.com/spell-correct.html, 2007, 10 pages.
Phua, C., et al., A Comprehensive Survey of Data Mining-based Fraud Detection Research, arXiv preprint arXiv: 1009.6119, 2010, 14 pages.
Prusher, I, "Parkland Mourns. Tragedy Strikes a Florida Community," Time, 2018, 7 pages.
Robertson, S., et al., "The Probabilistic Relevance Framework: BM25 and Beyond," Foundations and Trends in Information Retrieval, vol. 3, No. 4, 2009, pp. 333-389.
Rodriguez, J., "Poisson Models for Count Data," Acesso, vol. 10, No. 2, 2007, 14 pages.
Salvatier, J., et al., "Probabilistic Programming in Python using PyMC3," PeerJ Computer Science, 2016, 20 pages.
Saurav, S., et al., "Online Anomaly Detection with Concept Drift Adaptation using Recurrent Neural Networks," Proceedings of the ACM India Joint International Conference on Data Science Management of Data, 2018, pp. 78-87.
Savage, D., et al., "Anomaly Detection in Online Social Networks," Social Networks, vol. 39, No. 1, 2014, pp. 62-70.
Schreiber, J, "Pomegranate: fast and flexible probabilistic modeling in python," The Journal of Machine Learning Research, vol. 18, No. 1, 2017, pp. 5992-5997.
Seabold, S., et al., "Statsmodels: Econometric and Statistical Modeling with Python," Proceedings of the $9^{th}$ Python in Science Conference (SCIPY), 2010, 57 pages.
Shaoul, C., et al., "A reduced redundancy USENET corpus (2005-2011)," Westbury Lab Web Site, retrieved on Apr. 21, 2020 at http://www.psych.ualberta.ca/~westburylab/downloads/usenetcorpus.download.html, 2013, 2 pages.
Singh, N., et al., "Demystifying Numenta Anomaly Benchmark," IEEE International Joint Conference on Neural Networks (IJCNN), 2017, pp. 1570-1577.
"Skyline," Etsy, retrieved on Nov. 5, 2020 from https://github.com/etsy/skyline, 2015, 5 pages.
Sordoni, A., et al., "A Neural Network Approach to Context-Sensitive Generation of Conversational Responses," arXiv: 1506.06714v1, 2015, 11 pages.
Steyn, H. "On the multivariate poisson normal distribution," Journal of the American Statistical Association, vol. 71, No. 353, 1976, pp. 233-236.
"Surus," Netflix, retrieved on Nov. 5, 2020 from https://github.com/Netflix/Surus, 2015, 3 pages.
Tatbul, N., et al., "Precision and Recall for Time Series," $32^{nd}$ Conference on Neural Information Processing Systems (NeurIPS), 2018, 11 pages.
Taylor, S., et al., "Forecasting at Scale," https://facebookincubator, 2017, pp. 37-45.
"The Numenta Anomaly Benchmark," retrieved on Apr. 24, 2020 at https://github.com/numenta/NAB, 2018, 5 pages.
Vallis, O., et al., "A Novel Technique for Long-Term Anomaly Detection in the Cloud," HotCloud, 2014, 6 pages.
Wang, Z., et al. "Automatic Model Selection for Anomaly Detection," IEEE Computer Society, TrustCom-BigDataSE-ISPA, 2016, pp. 276-283.
Xia, Y., et al., "NIL is Not Nothing: Recognition of Chinese Network Informal Language Expressions," Proceedings of the $4^{th}$ SIGHAN Workshop on Chinese Language Processing, 2005, 8 pages.
Yamanishi, K., et al., "On-line Unsupervised Outlier Detection Using Finite Mixtures with Discounting Learning Algorithms," Data Mining and Knowledge Discovery, vol. 8, No. 3, 2004, pp. 275-300.
Zhu, L., et al., "Deep and Confident Prediction for Time Series at Uber," IEEE International Conference on Data Mining Workshops (ICDMW), 2017, 8 pages.

(56) References Cited

OTHER PUBLICATIONS

Zhuang, H., et al., "Identifying Semantically Deviating Outlier Documents," Proceedings of the 2017 Conference on Empirical Methods in Natural Language Processing, 2017, pp. 2748-2757.
Search Report, dated Nov. 15, 2019, received in connection with corresponding EP Patent Application No. 19201202.9.

* cited by examiner

MULTIVARIATE RISK ASSESSMENT VIA POISSON SHELVES

CROSS REFERENCE TO RELATED APPLICATIONS

This application is a divisional application of U.S. patent application Ser. No. 16/589,511, filed Oct. 1, 2019, which is a non-provisional patent application claiming priority to Provisional Patent Application Ser. No. 62/740,821, filed Oct. 3, 2018, both of which re incorporated by this reference in their entireties as if fully set forth herein.

BACKGROUND

Field

Embodiments of the present invention relate to risk assessment using Poisson Shelves.

Background

In fraud prevention, it desirable to not only determine if certain transactions are at risk, but to also do so in an accurate and automated fashion. Suppose a customer service center records the number of times a particular phone number calls per day. If the same number calls multiple times over a series of days, is this activity deemed unusual and risky? What criteria should a company apply to automatically determine if calls from one number are more or less risky than other calls? How should a company treat future calls from a risky number? These are the kinds of questions that must be answered daily by security engineers.

Published methods on unsupervised fraud detection span many disciplines, and generally center around clustering and pattern identification [Phua et al., 2010]. More recent surveys of fraud detection methods such as [Lata et al., 2015] contain very few active unsupervised methods. SmartSifter is the most similar to our multivariate methodology, where a mixture model is used to combine different modes in the cumulative data. SmartSifter is primarily used for discovering financial fraud [Yamanishi et al., 2004].

BRIEF SUMMARY OF THE DISCLOSURE

Accordingly, the present invention is directed to risk assessment using Poisson Shelves that obviates one or more of the problems due to limitations and disadvantages of the related art.

Herein, we consider relevant works to our topic and why there is a need for our technique. We then follow with a methodology, considering both the univariate and multivariate cases, where we describe how to obtain partition values, to detect shelves, and what are considered extreme outliers given a shelf. We then apply our technique to IVR call datasets. We finally discuss the implications of our results.

In accordance with the purpose(s) of this invention, as embodied and broadly described herein, this invention, in one aspect, relates to a computer program product comprising computer executable code embodied in a non-transitory computer readable medium that, when executing on one or more computing devices performs a method of performing risk assessment using count data. The method includes modeling the count data using a Poisson distribution; calculating a threshold value, co; partitioning the count data based on the threshold $\omega$; determining a number of surviving records from among the portioned count data based on the threshold $\omega$; identifying at least one shelf in the surviving records; and defining outliers for risk assessment according to the at least one the shelf.

In another aspect, the invention relates to a computer program product of identifying outliers for risk assessment using count data "Records" having y values. The method of this aspect includes computing a sample mean $\hat{\lambda}$ of y values in Records; calculating threshold value $\omega = \hat{\lambda} + n\sqrt{\hat{\lambda}}$, from n=0 to $n_{max}$, where n is the number of standard deviation units in $\omega$; for every $\omega$, computing a number of surviving records according to $|\{r \in Records: r[y] > \omega\}|$; identifying at least one shelf in surviving data by identifying an abrupt variation in generative parameters of a sequence of data; and defining outliers for further risk assessment according to $\{r \in Records: r[y] > \hat{\lambda} + n^*\sqrt{\hat{\lambda}}\}$.

In yet another aspect, the invention relates to a computer program product of identifying outliers for risk assessment in multivariable count data having a first count variable $x_i$ and a second count variable $y_i$. The method of this aspect includes calculating a mixture of independent Poissons: calculating a threshold value $\omega$ for every combination of mixture component c and dimension i; identifying at least one shelf in surviving data by identifying an abrupt variation in generative parameters of a sequence of data; defining outliers in component c; and providing a visual representation of the outliers.

In accordance with the purpose(s) of this invention, as embodied and broadly described herein, this invention, in one aspect, a method of performing risk assessment using count data including modeling the count data using a Poisson distribution; calculating a threshold value, $\omega$; partitioning the count data based on the threshold $\omega$; determining a number of surviving records from among the portioned count data based on the threshold $\omega$; identifying at least one shelf in the surviving records; and defining outliers for risk assessment according to the at least one the shelf.

In yet another aspect, the invention relates a method of identifying outliers for risk assessment using count data "Records" having y values, the method including computing a sample mean $\hat{\lambda}$ of y values in Records; calculating threshold value $\omega = \hat{\lambda} + n\sqrt{\hat{\lambda}}$, from n=0 to $n_{max}$, where n is the number of standard deviation units in $\omega$; for every $\omega$, computing a number of surviving records according to $|\{r \in Records: r[y] > \omega\}|$; identifying at least one shelf in surviving data by identifying an abrupt variation in generative parameters of a sequence of data; and defining outliers for further risk assessment according to $\{r \in Records: r[y] > \hat{\lambda} + n^*\sqrt{\hat{\lambda}}\}$.

In yet another aspect, the invention relates to a method of identifying outliers for risk assessment in multivariable count data having a first count variable $x_i$ and a second count variable $y_i$, the method including calculating a mixture of independent Poissons: calculating a threshold value $\omega$ for every combination of mixture component c and dimension i; identifying at least one shelf in surviving data by identifying an abrupt variation in generative parameters of a sequence of data; defining outliers in component c; and providing a visual representation of the outliers.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the risk assessment using Poisson Shelves, as well as the structure and operation of the various embodiments of the risk assessment using Poisson Shelves*, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate risk assessment using Poisson Shelves. Together with the description, the figures further serve to explain the principles of the risk assessment using Poisson Shelves described herein and thereby enable a person skilled in the pertinent art to perform and use risk assessment using Poisson Shelves.

DETAILED DESCRIPTION

Reference will now be made in detail to embodiments of the risk assessment using Poisson Shelves with reference to the accompanying figures The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

A method for determining the risk of a record using event frequency is described herein. An example applying the method to an example phone call problem is also described herein. The method is to help fraud and security analysts build systems using frequency in determining when future events may present risk. This method provides easy understanding and visualization for fraud and security analysts that may not have extensive background in statistics and outlier detection methodologies. The technique described herein may be categorized as a pattern recognition algorithm for detecting classes of data that appear to connote risk.

Figure 1:
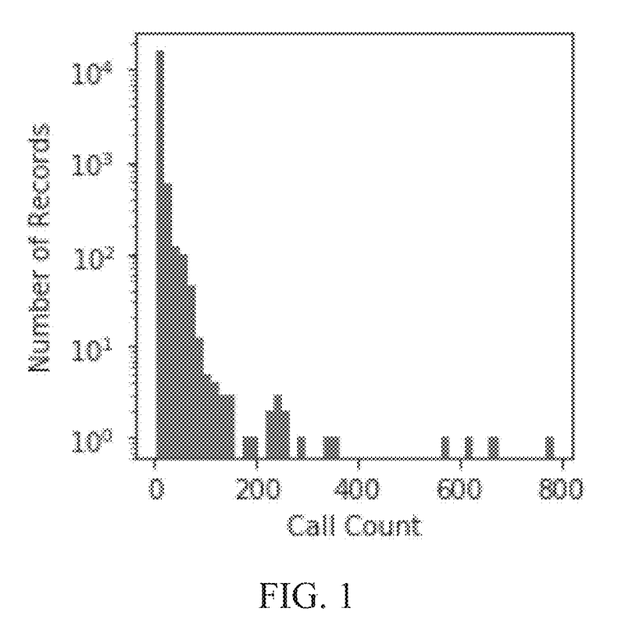
FIG. 1 is a graph showing cumulative call events for a series of approximately 17,000 calls to an IVR (Integrated Voice Recognition) system.

The intuition behind uncovering risk via frequency is best highlighted with a simple example. Consider every credit card transaction to be an event. Over a period of time, say an hour, we may expect to see several transactions for a single, given card. However, if 50 to 100 transactions occur for this card in that hour, the card may be at risk for fraud. Thus, counting the number of events is an intuitive way to determine risk. This intuition may be used to generate a rule for revealing risky records. As another example, consider FIG. 1, which shows cumulative call events for a series of approximately 17,000 calls to an IVR (Integrated Voice Recognition) system. In FIG. 1, the number of calls to the system is aggregated from each phone number over a period of time (one month). In the vast majority of cases, a phone number calls the IVR fewer than 10 times. However, there are some suspicious phone numbers that call more than 600 times in a one month period; this is approximately 20 calls made by one phone number per day!

The methodology described herein involves modeling these counts using a Poisson distribution and considering various thresholds for partitioning the data. The partitions are based on the mean and standard deviation of the data and also incorporate user choice, as what is considered fraudulent may differ from application to application. Records that are greater than a threshold value are considered surviving records, and plotting threshold parameters against the number of surviving records reveals distinct, shelf-like behavior. We exploit this phenomena to identify extreme outliers in detecting possible cases of fraud. We also modify and apply this methodology for multivariate datasets.

Truly risky calls are rare, and we want to minimize false positives. Thus, we must take special care in classifying the risk of individual calls. For example, suppose that 1 out of 1000 of the calls truly exhibit risky characteristics. Furthermore, suppose there exists a method that we can use to classify risk of calls from a given number with an accuracy of 98% with a false positive rate of 1%. Using this method to classify whether or not a given phone number is risky, what are the chances that the phone number is actually risky? Applying Bayes' Law:

$$P(\text{risk}\backslash\text{classifier}) = \frac{P(\text{classifier}\backslash\text{risk})P(\text{risk})}{P(\text{classifier})} = \frac{0.98 \cdot 0.001}{0.01} = 9.8\%$$

There is less than a ten percent likelihood that a given phone number identified as at risk for fraud is actually at risk under the assumptions given above.

Traditional classification methods (such as decision trees or SVMs) alone can thus be problematic, potentially causing a high likelihood of false positives. The technique described herein provides another level of assessment to pinpoint risky data before application of traditional classification methods of uncovering risk.

The technique described herein involves modeling count data using a Poisson distribution. Partition values are generated using the mean, standard deviation, and user choice. Because a Poisson distribution is used, the mean and variance are equivalent. By counting and plotting the number of data points greater than certain partition values (which we call surviving records), a distinct shelf-like pattern may emerge, which is the basis for our methodology. We begin by considering the univariate case and expand into multivariate data, as described below.

A random variable X has a Poisson distribution with parameter $\lambda > 0$ if X can have integer values x=0, 1, 2, ... with probability:

$$P(X=x) = \frac{\lambda^x e^{-\lambda}}{x!}$$

A feature of the Poisson distribution is that the mean ($\lambda$) is equivalent to the variance. That is:

$$E(X) = var(X) = \lambda$$

Counting events that occur independently over some period of time is typically modeled using the Poisson distribution. The phone call example discussed above can be modeled using a Poisson distribution.

A process satisfying the following three assumptions:
the probability of at least one occurrence of the event in a time interval is proportional to the interval length;
the probability of two or more occurrences of the event in a small time interval is negligible; and
the number of occurrences of the event in disjoint time intervals is mutually independent
is called a Poisson process. In the phone number example, the random variable is the number of times a particular phone calls the service center. The longer the time period, the higher the chance that the same phone number will call multiple times. In a small time interval, the chances are very low. Finally, the number of calls in disjoint time intervals is also mutually independent. Among the objectives of the process described herein are to partition the counts so we can distinguish risky data from non-risky records and to develop a partition methodology that is independent of the units of counting; the same method should be applicable to different types of count data.

We will use the parameter $\lambda$ from the Poisson distribution, which we obtain from the sample mean of the dataset. Let N represent the number of samples in the time period of interest and $x_i$ be a datapoint. We calculate $\hat{\lambda}$ by:

$$\hat{\lambda} = \frac{\sum_{i=0}^{N} x_i}{N}$$

We partition the data based on a threshold value, $\omega$:

$$\omega = \lambda + n \cdot \text{stdev}(X) = \lambda + n\sqrt{\lambda}$$

where n=0, 1, 2, ... is a standard deviation (stdev) multiplier and is user chosen. By varying the value of n, we can determine the number of data points greater than $\omega$. See Table 1 for the number of surviving records given n for a sample dataset.

TABLE 1

| n | Surviving Records | $\omega$ |
|---|---|---|
| 0 | 6831.0 | 1.74 |
| 1 | 690.0 | 4.32 |
| 2 | 279.0 | 6.90 |
| 3 | 133.0 | 9.48 |
| 4 | 91.0 | 12.06 |
| 5 | 68.0 | 14.64 |
| 6 | 47.0 | 17.22 |
| 7 | 38.0 | 19.80 |
| 8 | 30.0 | 22.37 |
| 9 | 28.0 | 24.95 |

Figure 2:
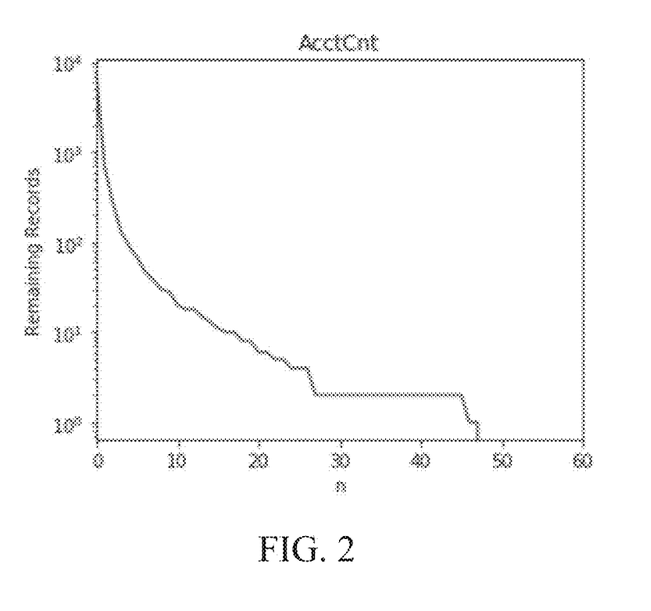
FIG. 2. is a plot showing n against the number of surviving records.

Table 1 shows the number of surviving records given n for the sample dataset in FIG. 2. Also listed are the threshold value, $\omega$, for every n as determined by $\lambda + n\sqrt{\lambda}$. This table shows only the first 10 values of n.

If we plot n against the number of surviving records (see FIG. 2), a distinct shelf-like pattern emerges starting from approximately n=27 to n=45. FIG. 2 is a plot showing the number of surviving records given n where n indicates the number of standard deviation units to use to calculate the threshold value, $\omega$. The y-axis is displayed in the log-scale. AcctCnt is the name of a field in our data. We use these shelves to identify extreme outliers in our data. In this example dataset, only 1 datapoint survives after the shelf.

We define an outlier as a data point that survives after the first shelf. Shelves can be detected by computing the probability distribution of the length of a current "run". For example, one could consider n=0 to n=26 to be one run and n=27 to n=45 to be another run. At n=27, a changepoint has occurred, where a changepoint is an abrupt variation in the generative parameters of a sequence of data. Herein, we use a Student's t-distribution and the concepts in [Adams and MacKay, 2007] to determine changepoints in our data, however, any suitable method may be used to identify changepoints as used herein, including concept drift detection techniques.

Not every run may be equivalent to a shelf. A linear regression analysis on log counts could be performed to determine if the slope of a run is below a certain threshold. A shelf and its length can also be specified via trial and error or by the user per the needs of the application. For example, a user could argue that, although short, a shelf occurs from n=24 to n=26. One could experiment with different Student's t-distribution parameters or with different members of the exponential distribution family entirely to detect shelves setting the application. Other distributions besides a Student's t-distribution can and should be considered and may be more applicable to survival graphs.

The method described herein can be applied to any univariate count of events satisfying the requirements of a Poisson process. An example, as applied to the phone numbers is described below. We call a function that returns the final n* value of the first detected shelf given a list of n's and corresponding numbers of surviving records shelfDetect( ).

Let Records be defined as follows:

Records={(x,y):phone #x calls y times}

To determine outliers:
1. Compute $\hat{\lambda}$, the sample mean of the y values in Records;
2. From n 0 to $n_{max}$, calculate $\omega = \hat{\lambda} + n\sqrt{\hat{\lambda}}$;

3. For every ω, compute the # of surviving records:

|{r∈Records:r[y]>ω}|

4. Run shelfDetect( ) to get n*
5. Outliers are defined as:

{r∈Records:r[y]>$\hat{\lambda}$+n*$\sqrt{\hat{\lambda}}$}

An aspect of risk detection is the ability to evaluate the interdependency of multiple count variables. This is a complex problem because multivariate distributions for count data have behaviors that can be difficult to analyze and understand or have severe restrictions. For example, multivariate count models where the marginal distributions are Poisson can only apply to situations where there are positive dependencies between the variables. According to the technique described herein, regardless of the number of multivariate dimensions, a graph of n against the number of surviving records can be produced, as shown in FIG. 2. To create this graph, ω in the multivariate case is determined. Once one decides how to derive ω, the methods described above can be used to reveal outliers in the joint distribution of multiple columns of data as easily as it can with univariate data. A technique that can be used in calculating ω is described below. Other techniques can be substituted for calculating ω.

In [Inouye et al., 2017], several classes of multivariate distributions derived from the univariate Poisson are introduced. The first class where the marginal distributions are Poisson can apply to situations where there are positive dependencies between the variables. Negative relationships are always a possibility in real-world datasets, potentially restricting the use of this option. The second class involves a mixture of independent Poissons:

$$\mathbb{P}_{MixedPoi}(x) = \int_{R_{++}^d} g(\lambda) \prod_{i=1}^d \mathbb{P}_{Poiss}(x_i|\lambda_i) d\lambda$$

where x=[$x_1$, $x_2$, ... $x_d$], d is the dimension of the data, λ=[$\lambda_1$, $\lambda_2$, ... $\lambda_d$] is a vector where $\lambda_i$ is the parameter of the Poisson distribution for $x_i$, and g(λ) is the mixing distribution. As we have counting data, we work in the domain of positive, real numbers, notated as R++.

Poisson mixture generalizations allow for positive and negative variable dependencies as opposed to Poisson marginal distributions. They can also model overdispersion where the variance of the data is larger than the mean, a common feature in real world data.

Typically, expectation-maximization is used to refine the parameters of the mixture model, iterating until convergence. For every combination of mixture component c and dimension i, ω can be calculated:

$$\omega_{ic} = \hat{\lambda}_{ic} + n\sqrt{\hat{\lambda}_{ic}}$$

to create the survival graphs like in FIG. 2.

Applying this procedure to the phone numbers example once more, let Records now be a set containing elements of the form (x, $y_1$, $y_2$, ... $y_d$) where phone number x is associated with $y_i$ count data. For example, $y_1$ could be how many times phone number x called in the time period, and $y_2$ could be how many social security numbers are referenced by phone number x. Let Records$_c$ represent the records in component c. An outlier in a component c is then defined as:

{r∈Records$_c$:∃$_i$ s.t. r[$y_i$]>$\lambda_{ic}$+$n_{ic}$*$\sqrt{\lambda_{ic}}$} where $y_i$ is the ith dimension of count data, and n*$_{ic}$ is the final n value of the first detected shelf in the ith dimension for component c.

The methods described herein can be applied to historical call records to surface phone numbers that may have been (or are being) used for fraudulent access to a company's systems. As an example, let's look at the anonymized output of an IVR system servicing a financial company containing 16,819 phone numbers. Historical calls are accumulated and counted in the various columns of data. Some example values appear in Table 2.

TABLE 2

| AcctCnt | CallCnt | Auth2Cnt | Auth3Cnt | Auth4Cnt | EPCnt1 | EpCnt3 |
|---|---|---|---|---|---|---|
| 5 | 15 | 5 | 5 | 3 | 0 | 1 |
| 3 | 57 | 3 | 3 | 8 | 0 | 0 |
| 4 | 8 | 3 | 3 | 4 | 0 | 0 |
| 5 | 14 | 5 | 5 | 6 | 1 | 0 |
| 3 | 8 | 2 | 2 | 4 | 0 | 0 |

Negative relationships are present, deterring use of marginal Poisson distributions in [Inouye et al., 2017].

Figure 3:
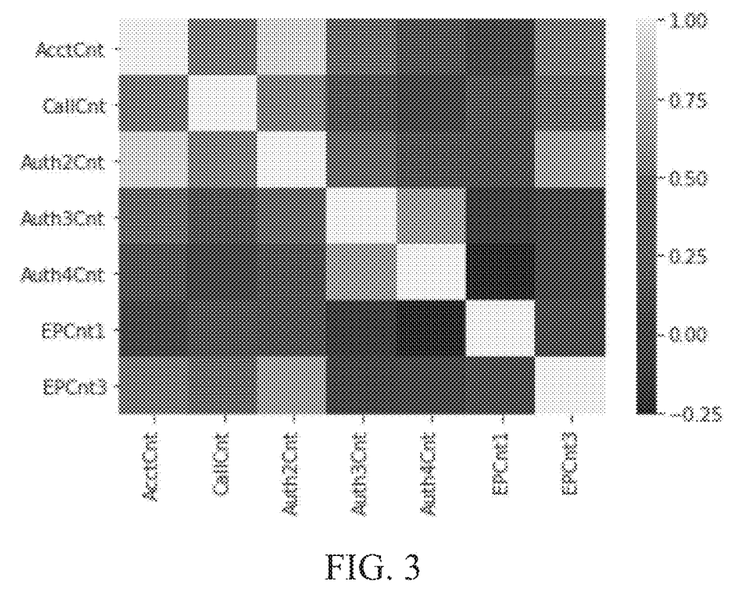
FIG. 3 is a correlation heatmap of the complete data in Table 2.

FIG. 3 is a correlation heatmap of the complete data in Table 2. Table 2 shows some sample data from a set of approximately 17,000 phone numbers from an IVR system over the course of a month. Every row represents counts for a single unique phone number. For example, whatever phone number is associated with the first row has called 15 times (CallCnt) and has referred to 5 unique accounts (AcctCnt) in its calls. Negative relationships are present, making use of marginal Poisson distributions less desirable.

Figure 10:
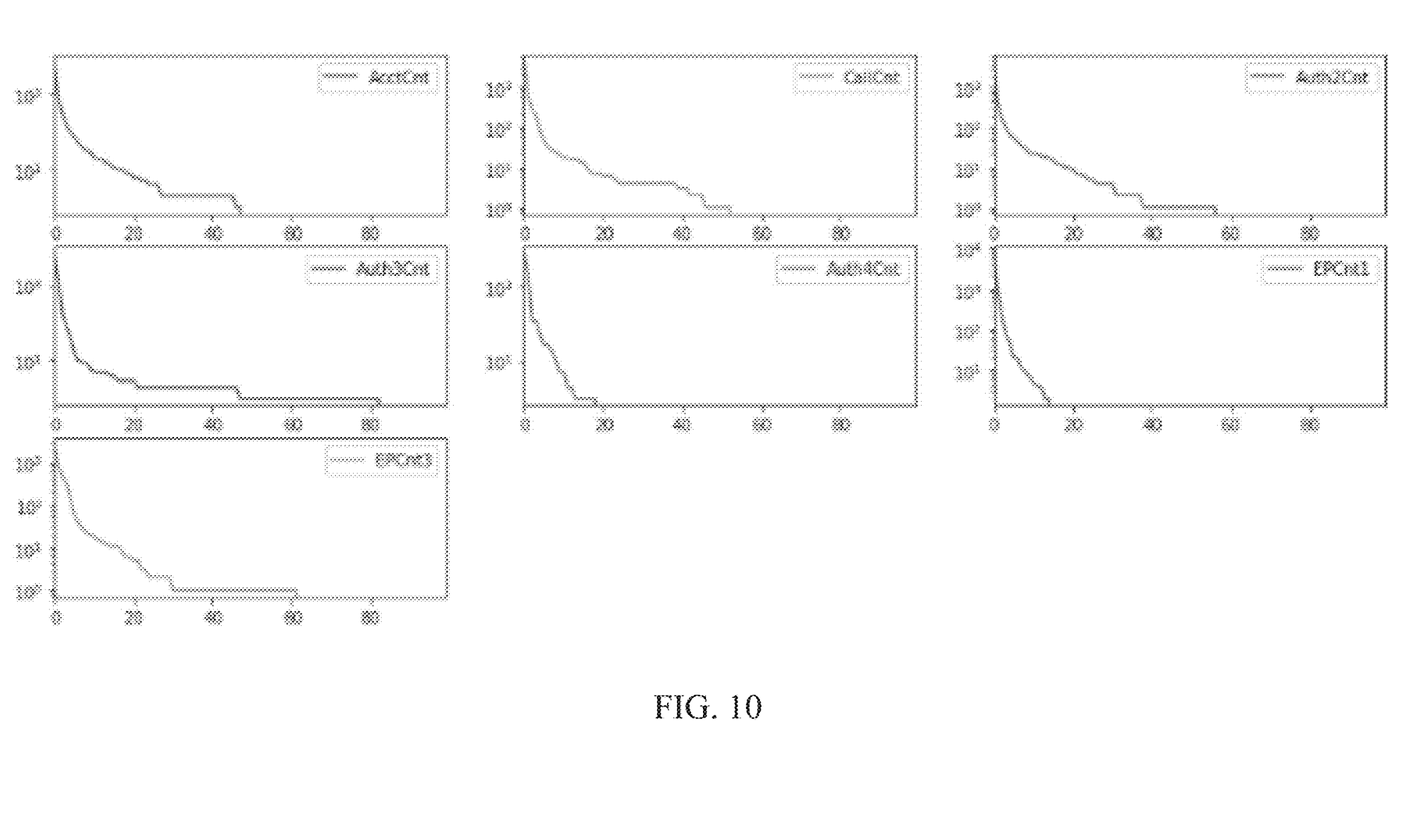
FIG. 10 shows dataset univariate plots of the number of surviving records for every field given n where n is the number of standard deviation units in $\omega$.
Figure 11:
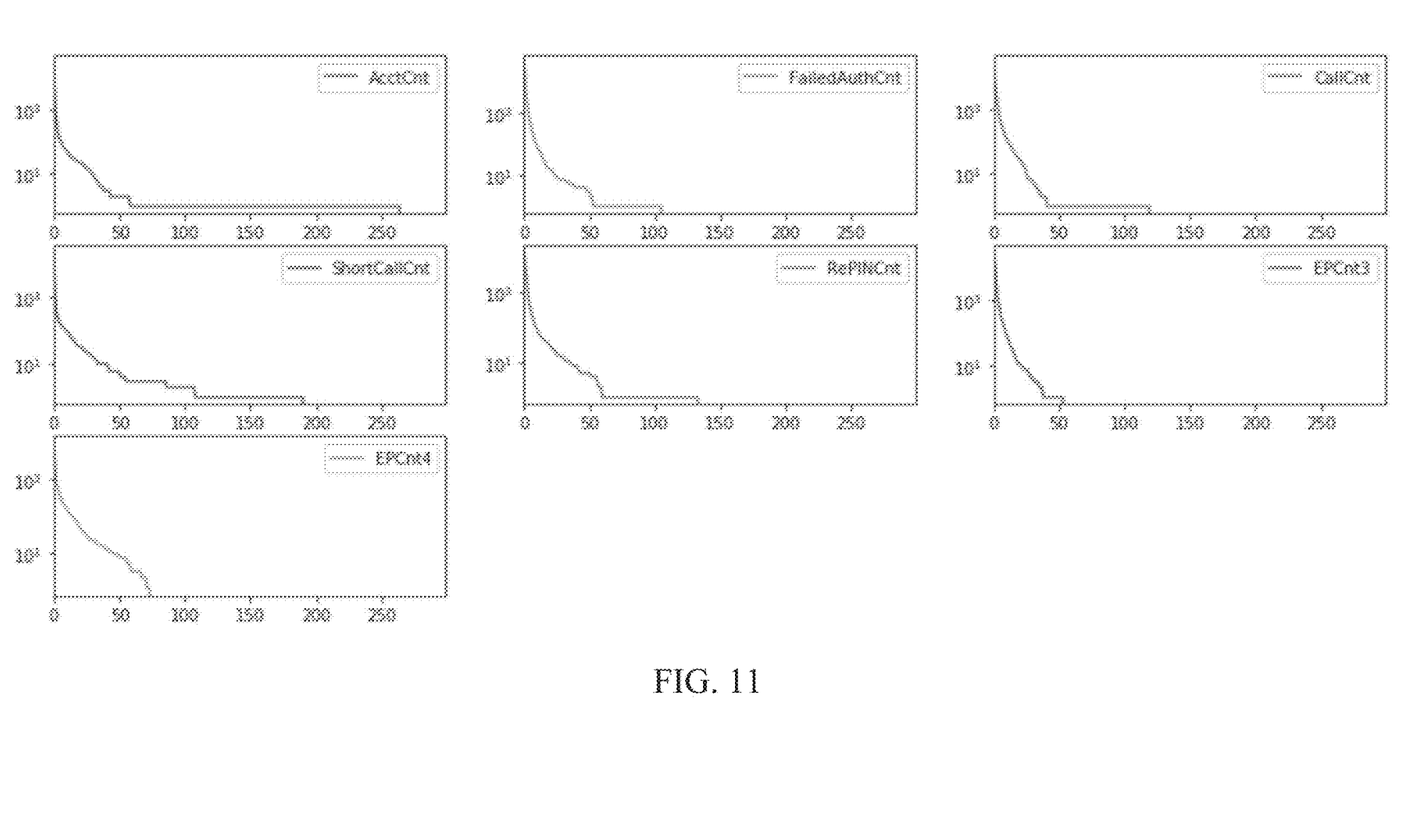
FIG. 11 shows dataset univariate plots of the number of surviving records for every field given n where n is the number of standard deviation units in $\omega$.
Figure 12:
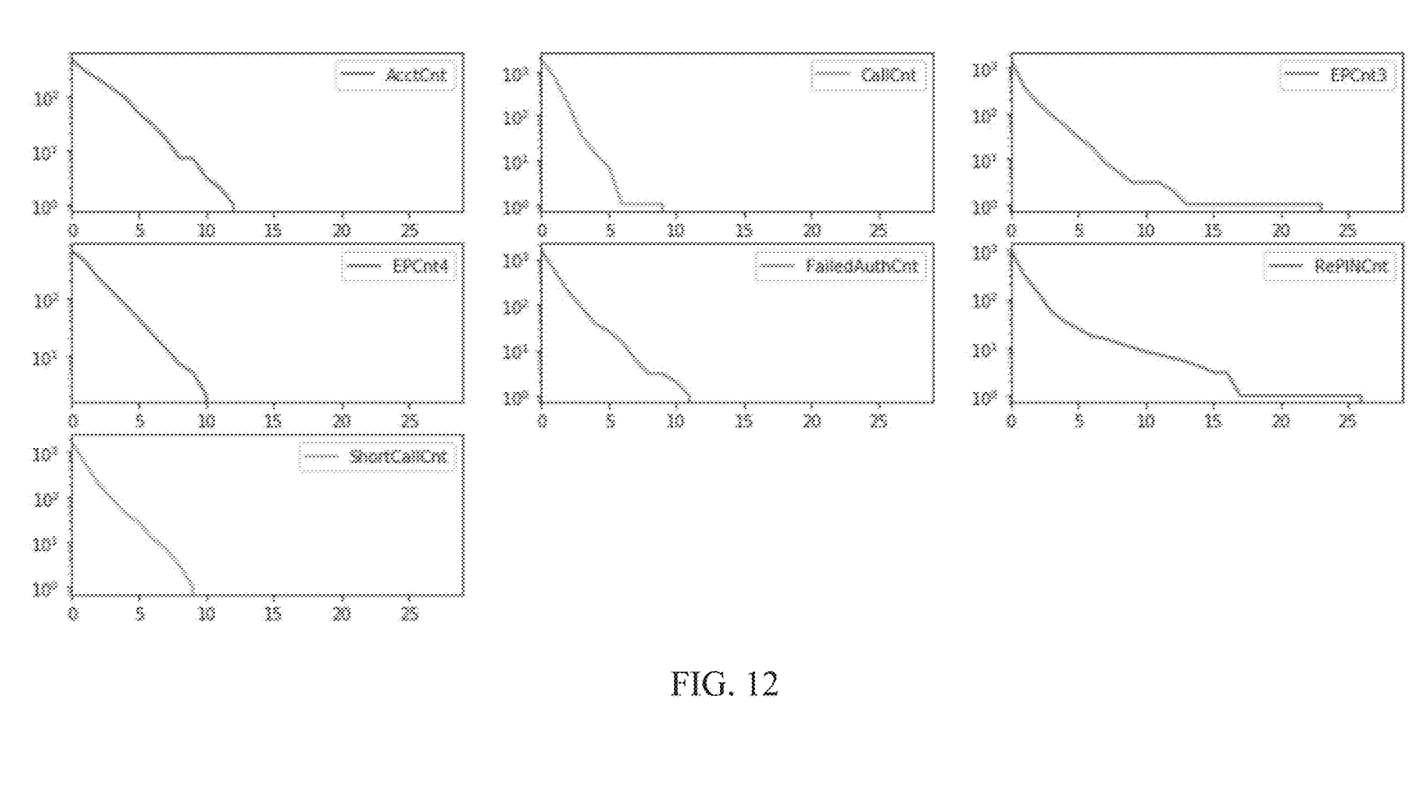
FIG. 12 shows dataset multivariate plots for component 1, which has 4,595 points.

We apply the process described herein to the data in Table 2 and plot the number of surviving records for every field given n where n is the number of standard deviation units in ω. Survival plots for every field are available in FIGS. 10-12. FIG. 10 shows dataset univariate plots of the number of surviving records for every field given n where n is the number of standard deviation units in ω. FIG. 11 shows dataset univariate plots of the number of surviving records for every field given n where n is the number of standard deviation units in ω. FIG. 12 shows dataset multivariate plots for component 1, which has 4,595 points. ω is calculated for every dimension of i of the data ($\omega_i$=$\hat{\lambda}_i$+n$\sqrt{\hat{\lambda}_i}$). In FIGS. 10-12, the y-axis is displayed in log-scale.

We focus on the AcctCnt field for now and use [Adams and MacKay, 2007] to determine change points in our data. Using the Python implementation of [Adams and MacKay, 2007] on AcctCnt, the posterior probability (P($r_t$|$x_{1:t}$)) of the current run $r_t$'s length at each step ($x_i$ for i=1 ... t) can be displayed, using a logarithmic color scale (see FIG. 4B). There are several differences between [Adams and MacKay, 2007] and its implementation. [Adams and MacKay, 2007] suggests exponential-family distributions for the runs, and [Kulick, 2016] specifies this by using the Student's t-distribution as the predictive distribution associated with runs. In addition, [Kulick, 2016] uses a heuristic to generate the visual in FIG. 4C, which evaluates the probability of a changepoint occurring by looking N$_ω$ samples prior. We use N$_ω$=15 in FIG. 4.

Figure 4A:
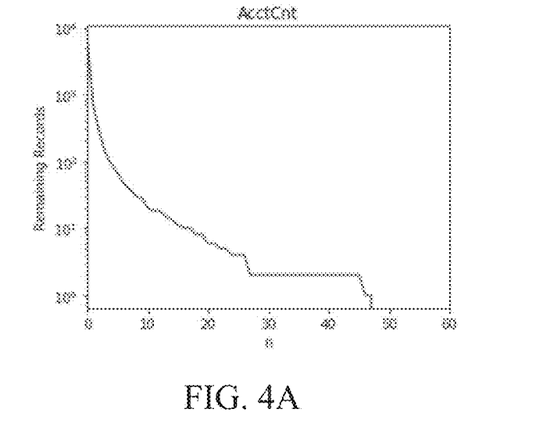
FIG. 4A shows surviving records for AcctCnt.
Figure 4B:
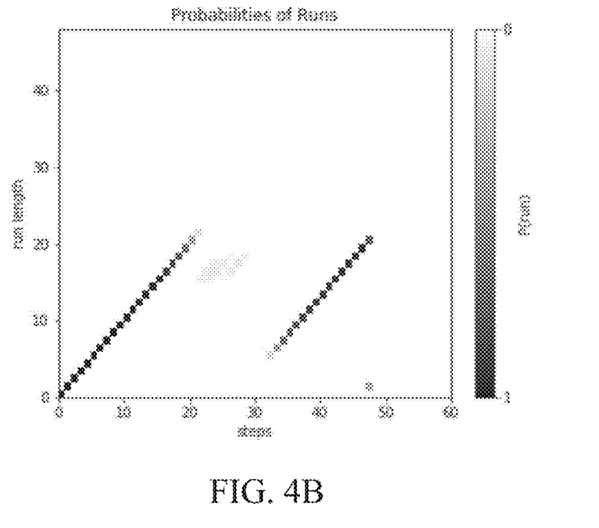
FIG. 4B shows the posterior probability of the current run $r_t$'s length at each step.
Figure 4C:
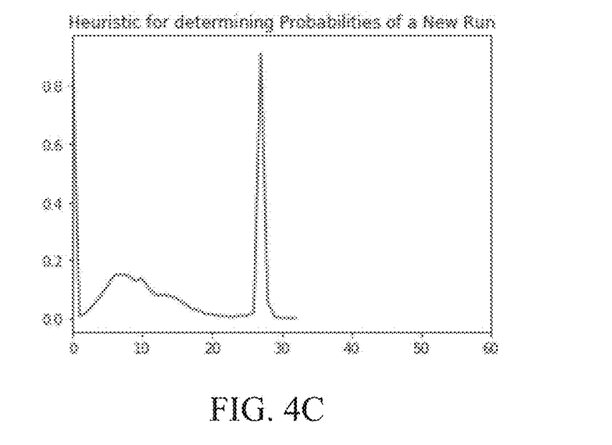
FIG. 4C shows the probability of a changepoint occurring by looking $N_\omega=15$ samples prior.

FIG. 4A shows surviving records for AcctCnt. FIG. 4B shows the posterior probability (P($r_t$|$x_{1:t}$)) of the current run $r_t$'s length at each step ($x_i$ for i=1 ... t) using a logarithmic grayscale. FIG. 4C shows the probability of a changepoint occurring by looking $N_\omega=15$ samples prior. Note that because of this prior sample's requirement, the final visual is cut off early.

Two runs appear to dominate in the second visual of FIG. 4, one from n=0 to n=27 and another from n=27 to n=45. We can then analyze the summary statistics of each of those runs and see how they change over time. The mean and variance of the run from n=27 to n=45 do not change; this suggests that the second run is a potential shelf. All records surviving past n=45 would be considered outliers.

For AcctCnt, this gives rise to 1 outlier record; this particular phone number has called over 120 times in the span of 1 month! The surviving data past the first shelf exhibits extreme values that are in the long tail of the assumed Poisson distribution, and, thus, are candidates for risk of fraudulent or other aberrant usage.

Looking now at the multivariate case by considering all fields in dataset 1, we begin by fitting the data in Table 2 to a Poisson mixture model using the Python library Pomegranate [Schreiber, 2017]. As we wish to learn distribution parameters entirely from data, we use the from_samples class method which runs k-means to initialize the components. Returned clusters are used to initialize all parameters of the distributions. Thus, we are using a multivariate Gaussian for the mixing distribution, $g(\lambda)$. [Steyn, 1976] also used multivariate Gaussians for the mixing distribution to provide more flexibility on the correlation structure.

Figure 5:
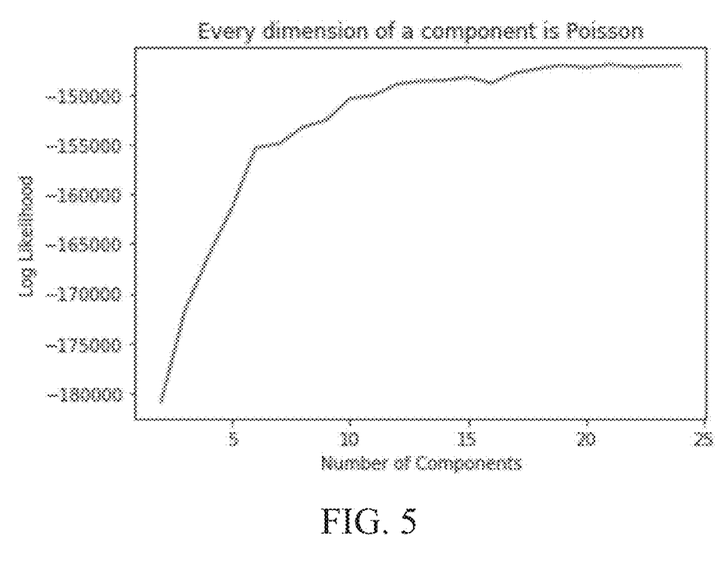
FIG. 5 illustrates determining the number of components for the mixture model.

To determine the number of components in the mixture model, the log-likelihood is graphed in FIG. 5, which illustrates determining the number of components for the mixture model, the log-likelihoods (averaged over 5 runs each) for varying numbers of components are considered.

Figure 6:
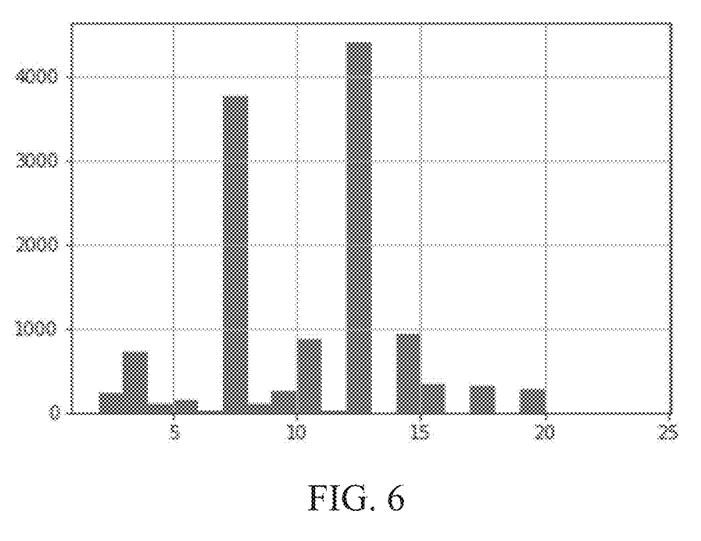
FIG. 6 is a histogram of the distribution of points amongst the mixture model components.

At roughly 10 components, the log-likelihood begins to plateau. We choose 20 components and use posterior probabilities to predict the most likely component which generated each sample. With Pomegranate, this is efficient, taking 56.78 seconds on a laptop with an Intel Core i7-4710MQ CPU @ 2.50 GHz, 16 GB of RAM, running Ubuntu 16.04. The distribution of components is displayed in FIG. 6. FIG. 6 is a histogram of the distribution of points amongst the mixture model components.

Figure 7:
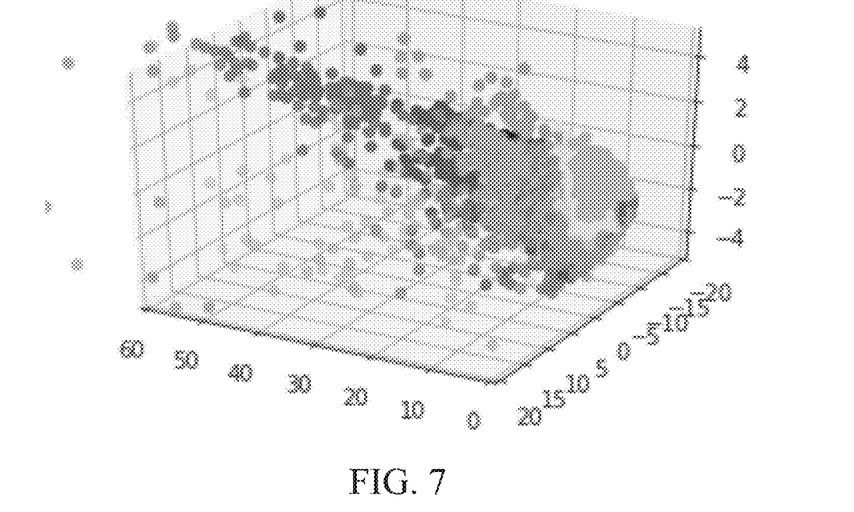
FIG. 7 illustrates performing PCA to reduce the number of dimensions.

As an additional experiment and sanity check on the mixture model, we performed principal component analysis (PCA) to reduce the number of dimensions to 3 and grayscale the points based on the component the point belongs to in FIG. 7. FIG. 7 illustrates performing PCA to reduce the number of dimensions to 3 and grayscale the points based on the component the point belongs to after determining what component every point belongs to using posterior probabilities.

We then use the parameters of the mixture model to determine ω thresholds for every dimension and component. Recall that $\omega_{ic}=\hat{\lambda}_{ic}+n\sqrt{\hat{\lambda}_{ic}}$, where $\hat{\lambda}_{ic}$ is the parameter of the Poisson distribution for dimension i and component c. Once survival graphs are created for every component and dimension, run shelfDetect( ). A point is an outlier if at least one of its dimensions i contains a shelf and has records surviving the first shelf ($r[y_i] > \hat{\lambda}_{ic} + n^*_{ic} \sqrt{\hat{\lambda}_{ic}}$). Note that $n^*_{ic}$ is the final n value of the first detected shelf in the ith dimension and component c.

Figure 8:
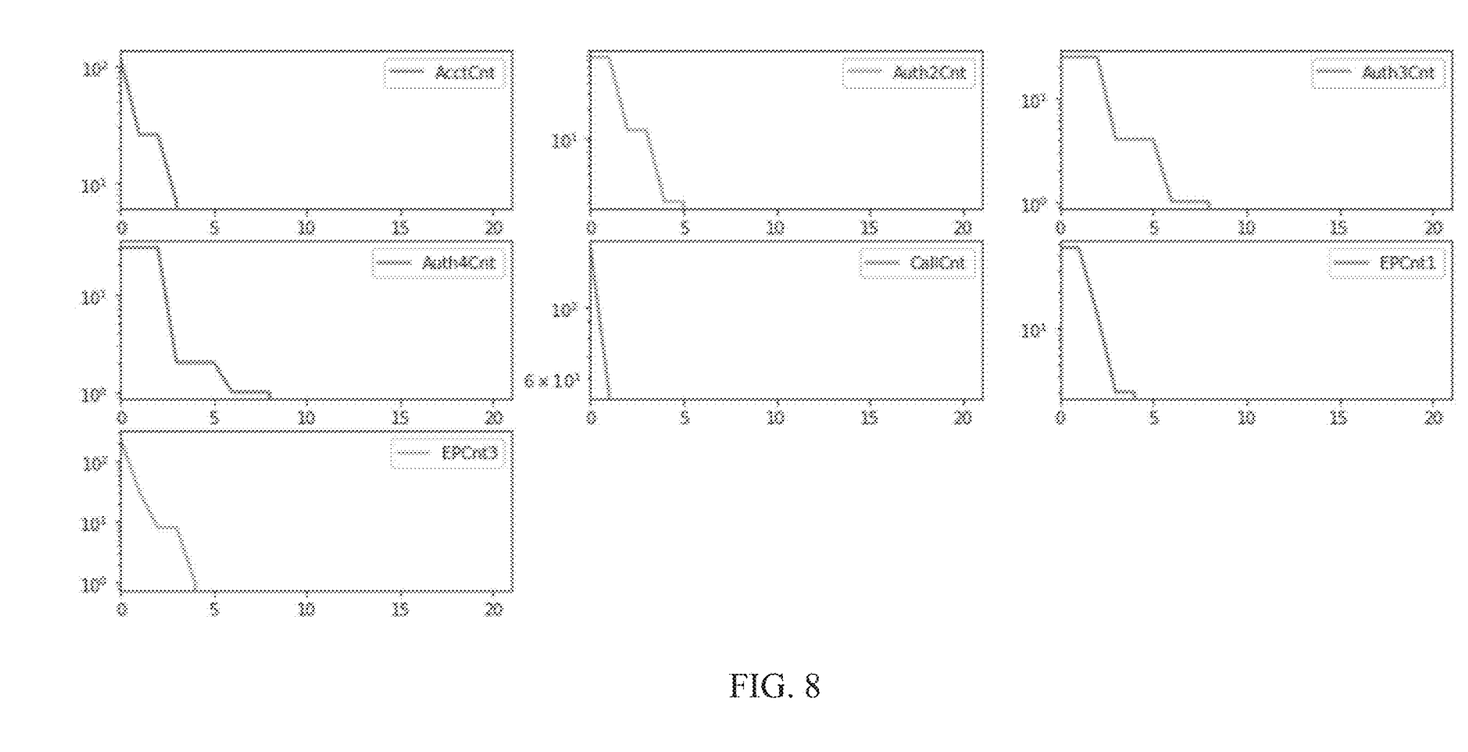
FIG. 8 are survival graphs for component 15 of a dataset of 330 datapoints.

FIG. 8 shows survival graphs for a dataset having 330 datapoints. ω is calculated for every dimension of i of the data ($\omega_i=\hat{\lambda}_i+n\sqrt{\hat{\lambda}_i}$) to create these survival graphs. For example, looking at FIG. 8, in component 15, Auth4Cnt has a shelf starting from n=0 and ending at n=2 (supposing that we set a minimum shelf length of 2). All points in component 15 that have Auth4Cnt values greater than $\lambda_{Auth4Cn^\wedge t,\ comp\ 15}+2^*(\lambda_{Auth4Cn^\wedge t,\ comp\ 15})^{1/2}$ are outliers. More outliers may exist if we consider other fields and their respective shelves. Depending on user-specified shelf length, any points past n=2 in Auth3Cnt might be considered an outlier.

Then all points in component 15 that have Auth3Cnt values greater than $\lambda_{Auth3Cn^\wedge t,\ comp\ 15}+2^*(\lambda_{Auth3Cn^\wedge t,\ comp\ 15})^{1/2}$ are also outliers, and they may be different than the outliers discovered using Auth4Cnt.

Figure 9:
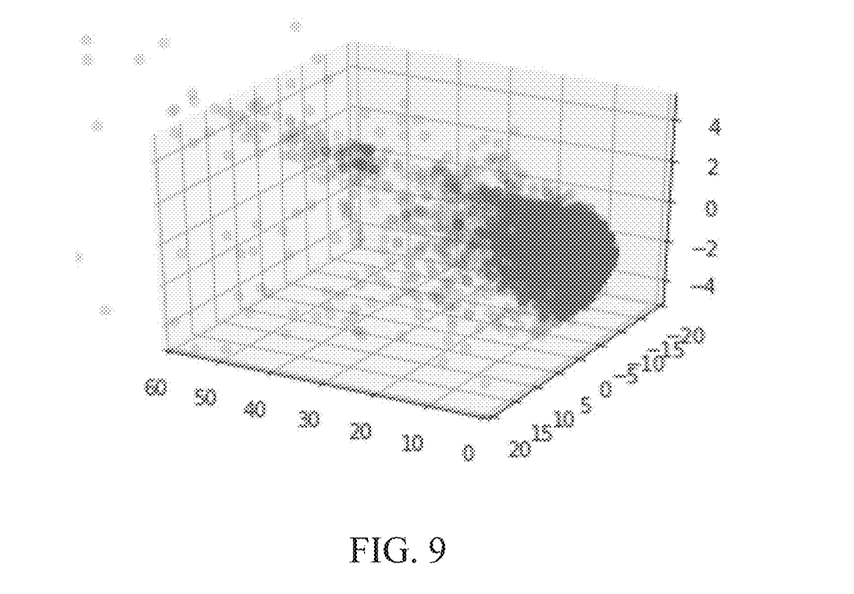
FIG. 9 shows data like in FIG. 7 except points are grayscaled depending on if they are outliers or not.

FIG. 9 displays the data like in FIG. 7 except points are grayscaled depending on if they are outliers or not. Using a shelf size of 3, 13 outliers are present in the data.

We consider another dataset from an IVR system servicing a financial company containing 103,823 phone numbers over the course of a month. This dataset contains several fields not present in the dataset discussed above, and their definitions are provided in Table 3.

TABLE 3

| Field | Description |
| --- | --- |
| AcctCnt | Number of unique accounts referenced by phone number x |
| CallCnt | Number of times the phone number x called |
| Auth2Cnt | Number of social security numbers (SSNs) referenced by phone number x |
| Auth3Cnt | Number of zip codes referenced by phone number x |
| Auth4Cnt | Number of financial institutions referenced by phone number x |
| EPCnt1 | Number of times the phone number x hit exit point 1 which occurs when payment succeeds |
| EPCnt3 | Number of times the phone number x hit exit point 3 which occurs when caller exited prior to SSN entry |

The differences between this dataset and the one discussed above highlight advantages of the present methodology. Although both datasets are generated by accumulating call data to an IVR from external phone numbers, they have different IVR call tree structures. A call tree determines the path callers traverse and the exit points available to them. Call trees can be very complex and vary widely in their functionalities. However, the shelf method is the same regardless of the call data collected by the IVR system and the structure of the call tree. This makes the present method useful for discovering risk in a wide variety of datasets and call tree structures. Another difference between the two datasets is that all correlations between the fields in this second dataset are positive, opening up the possibility of class 1 methods (marginal Poisson distributions) in the [Inouye et al., 2017] paper.

In the multivariate case, we once again analyze log-likelihood plots to determine the number of components (10) and use posterior probabilities to assign points to components. The survival graphs in the univariate and multivariate are provided in FIGS. 10-12.

We have demonstrated the existence of shelves and have shown that the records that survive the first shelf (phone numbers that exhibit relatively unusual activity) represent outliers compared to the expected regular distribution of calls according to the Poisson assumption.

In some cases, no shelf exists. In these cases, one of two things is true: (1) either the distribution of survivors is very "thin" (i.e., no survivors exhibit extreme counts) or (2) there is a relatively continuous slow drop in the number of survivors as we increase n.

In the first case, our method may not identify any extreme behavior and so, in turn, won't identify any risk in those calls. If the calls still contain risk, then it must be surfaced in a different way. In the second case, we may be missing risk and an addition to our algorithm to analyze the slope of the survivor counts as n changes may be provided to account for very small but continuous-looking shelves in the data.

The data may also exhibit multiple shelves. The algorithm and method presented herein picks the first shelf of a given length, but could be modified to look for the longest shelf, the last shelf of a given length, or provide a selection of such methods for an analyst. The point of picking the first matching shelf is to capture the initial significant deviation from the assumed distribution of survivors. This is a simple and consistent way of separating data that may belong to a different distribution that connotes risk, but the method is not so limited.

We used a mixture model to represent the dependencies between variables of the call data. There are other methods for generating multivariate distributions from count data that could be used in the present process. One interesting method is to use copulas to model the dependencies between the marginal parameters like in [Inouye et al., 2017]. Another possible methodology is to create a series of bivariate Poisson distributions over the call data and look for dependencies that match the marginal distributions.

Other possibilities include acquiring and applying this method to count data in a different domain. We have call data represented as examples herein, but other types of count data could be analyzed using the methodologies described herein. Also, different default distributions besides a Poisson may be used. If the data exhibits strong overdispersion, a negative binomial distribution may be more appropriate as the relationship between the mean and variance can be better controlled. In addition, other distributions instead of a Student's t-distribution may be used for determining shelves, but may be selected depending on whether the graphs, like FIG. 2, have a negative slope and shelves are zones of 0 variance. Pomegranate's from samples also assumes multivariate Gaussians for the mixing proportions, but may not be best suited because (1) the present data is discrete, and (2) $\lambda$ must reside in the positive reals, but a normal distribution is defined on the reals [Inouye et al., 2017].

We have presented a method for determining potentially risky examples in count data. This method may be unsupervised and provides visual feedback on the results of the algorithm. In the examples provided herein, this method is demonstrated by application to data collected from IVR (Integrated Voice Recognition) systems in the financial industry and to call counts and other parameters related to the IVR call tree specification. In cases where shelves were found, we were able to isolate groups of outlier phone numbers that exhibited behavior indicative of fraud risk. In conjunction with other fraud and risk detection methods, we believe that this method is a powerful addition to a telephone fraud detection system.

The method disclosed herein is novel in the following ways:
  The method is approximate, unsupervised, simple, and fast.
  It is easy to visualize, and, thus, easy for nontechnical people to use and evaluate.
  It relies solely on survival statistics from the dataset, so it is applicable to univariate and multivariate datasets, providing simple visualizations based on survival counts.

The present method differs from others by focusing on a simple algorithm for segregating survival data. The focus is not on calculating the mixture of distributions in the data like Smartsifter, but, instead, on providing tools for security engineers to identify and evaluate sources of potentially fraudulent activity.

Throughout this application, various publications may have been referenced. The disclosures of these publications in their entireties are hereby incorporated by reference into this application in order to more fully describe the state of the art to which this invention pertains:

[Adams and MacKay, 2007] Adams, R. P. and MacKay, D. J. (2007). Bayesian online changepoint detection. arXiv preprint arXiv:0710.3742.

[Inouye et al., 2017] Inouye, D. I., Yang, E., Allen, G. I., and Ravikumar, P. (2017). A review of multivariate distributions for count data derived from the poisson distribution. Wiley Interdisciplinary Reviews: Computational Statistics, 9(3):e1398.

[Kulick, 2016] Kulick, J. (2016). Bayesian changepoint detection. https://github.com/hildensia/bayesian_changepoint_detection.

[Lata et al., 2015] Lata, L. N., Koushika, 1. A., and Hasan, S. S. (2015). A comprehensive survey of fraud detection techniques. International Journal of Applied Information Systems, 10(2):26{32.

[Phua et al., 2010] Phua, C., Lee, V., Smith, K., and Gayler, R. (2010). A comprehensive survey of data mining-based fraud detection research. arXivpreprint arXiv:1009.6119.

[Rodriguez, 2007] Rodriguez, G. (2007). Poisson models for count data. acesso, 10(1):2014.

[Schreiber, 2017] Schreiber, J. (2017). Pomegranate: fast and exible probabilistic modeling in python. The Journal of Machine Learning Research, 18(1): 5992{5997.

[Steyn, 1976] Steyn, H. (1976). On the multivariate poisson normal distribution. Journal of the American Statistical Association, 71(353):233{236.

[Yamanishi et al., 2004] Yamanishi, K., Takeuchi, J.-I., Williams, G., and Milne, P. (2004). On-line unsupervised outlier detection using nite mixtures with discounting learning algorithms. Data Mining and Knowledge Discovery, 8(3):275{300}.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A non-transitory computer readable medium comprising instructions that, when executed by a processor of a processing system, cause the processing system to perform a method for identifying outliers for risk assessment using count data "Records" having y values, the method comprising:
  computing a sample mean $\hat{\lambda}$ of y values in Records;
  calculating threshold value $\omega = \hat{\lambda} + n\sqrt{\hat{\lambda}}$, from n=0 to $n_{max}$, where n is the number of standard deviation units in $\omega$;
  for every $\omega$, computing a number of surviving records according to $|\{r \in Records: r[y] > \omega\}|$;
  identifying at least one shelf in surviving data by identifying an abrupt variation in generative parameters of a sequence of data; and
  defining outliers for further risk assessment according to $\{r \in Records\ r[y] > \hat{\lambda} + n*\sqrt{\hat{\lambda}}\}$.

2. The non-transitory computer readable medium of claim 1, the method further comprising creating a visual representation of the surviving data for identifying the at least one shelf.

3. The non-transitory computer readable medium of claim 1, wherein identifying the at least one shelf comprises identifying an abrupt variation in the generative parameters of a sequence of data.

4. The non-transitory computer readable medium of claim 1, wherein the at least one shelf is identified using concept drift detection.

5. The non-transitory computer readable medium of claim 1, wherein the threshold value ω is calculated according to:

$$\omega = \hat{\lambda} + n \times \mathrm{stdev}(X) = \hat{\lambda} + n\sqrt{\hat{\lambda}}$$

where n is the number of standard deviation units in ω, λ is the mean of the Poisson distribution and X is a random variable having integer values.

6. The non-transitory computer readable medium of claim 5, the method further comprising determining a number of datapoints greater than the threshold ω for a given number of standard deviation units n.

7. The non-transitory computer readable medium of claim 1, wherein identifying the at least one shelf comprises identifying an abrupt variation in the generative parameters of a sequence of data.

8. A method of identifying outliers for risk assessment using count data "Records" having y values, comprising:
- computing a sample mean $\hat{\lambda}$ of y values in Records;
- calculating threshold value $\omega = \hat{\lambda} + n\sqrt{\hat{\lambda}}$, from n=0 to $n_{max}$, where n is the number of standard deviation units in ω;
- for every ω, computing a number of surviving records according to $|\{r \in \mathrm{Records}: r[y] > \omega\}|$;
- identifying a shelf in surviving data by identifying an abrupt variation in generative parameters of a sequence of data; and
- defining outliers for further risk assessment according to $\{r \in \mathrm{Records}\ r[y] > \hat{\lambda} + n*\sqrt{\hat{\lambda}}\}$.

9. The method of claim 8, the method further comprising creating a visual representation of the surviving data for identifying the at least one shelf.

10. The method of claim 8, wherein the at least one shelf is user-identified based on the visual representation.

11. The method of claim 8, wherein the threshold value co is calculated according to:

$$\omega = \hat{\lambda} + n \times \mathrm{stdev}(X) = \hat{\lambda} + n\sqrt{\hat{\lambda}}$$

where n is the number of standard deviation units in ω, λ is the mean of the Poisson distribution and X is a random variable having integer values.

12. The method of claim 11, further comprising determining a number of datapoints greater than the threshold ω for a given number of standard deviation units n.

13. The method of claim 8, wherein identifying the at least one shelf comprises identifying an abrupt variation in the generative parameters of a sequence of data.

14. A system for identifying outliers for risk assessment using count data "Records" having y values, comprising:
- a memory comprising executable instructions;
- a processor configured to execute the executable instructions and cause the system to:
  - compute a sample mean $\hat{\lambda}$ of y values in Records;
  - calculating threshold value $\omega = \hat{\lambda} + n\sqrt{\hat{\lambda}}$, from n=0 to $n_{max}$, where n is the number of standard deviation units in ω;
  - for every ω, computing a number of surviving records according to $|\{r \in \mathrm{Records}: r[y] > \omega\}|$;
  - identify a shelf in surviving data by identifying an abrupt variation in generative parameters of a sequence of data; and
  - define outliers for further risk assessment according to $\{r \in \mathrm{Records}: r[y] > \hat{\lambda} + n*\sqrt{\hat{\lambda}}\}$.

15. The system of claim 14, the processor further configured to execute the executable instructions to cause the system to create a visual representation of the surviving data for identifying the at least one shelf.

16. The system of claim 14, wherein identifying the at least one shelf comprises identifying an abrupt variation in the generative parameters of a sequence of data.

17. The system of claim 14, wherein the at least one shelf if identified using concept drift detection.

18. The system of claim 14, wherein the threshold value co is calculated according to:

$$\omega = \hat{\lambda} + n \times \mathrm{stdev}(X) = \hat{\lambda} + n\sqrt{\hat{\lambda}}$$

where n is the number of standard deviation units in ω, λ is the mean of the Poisson distribution and X is a random variable having integer values.

19. The system of claim 18, the processor further configured to execute the executable instructions to cause the system to determine a number of datapoints greater than the threshold ω for a given number of standard deviation units n.

* * * * *